Nov. 30, 1971     S. DRESHER     3,623,407

VIBRATORY COMPACTION ROLLER

Filed Nov. 21, 1969     3 Sheets-Sheet 1

INVENTOR
*SEYMOUR DRESHER*
BY
*Frank H. Thompson*
ATTORNEY

INVENTOR
SEYMOUR DRESHER
BY
ATTORNEY

INVENTOR
*SEYMOUR DRESHER*
BY
*Frank H. Thomson*
ATTORNEY

United States Patent Office 3,623,407
Patented Nov. 30, 1971

3,623,407
VIBRATORY COMPACTION ROLLER
Seymour Dresher, Morristown, N.J., assignor to Ingersoll-Rand Company, New York, N.Y.
Filed Nov. 21, 1969, Ser. No. 878,689
Int. Cl. E01c 19/28
U.S. Cl. 94—50
13 Claims

ABSTRACT OF THE DISCLOSURE

A vibratory compaction roller which includes a drum rotatably mounted on a frame. A central shaft having an eccentric weight is rotatably mounted within the drum. A motor rotates the central shaft to cause vibration of the drum. The bearings which mount the central shaft are separate from the bearings which mount the drum on the frame. Shock absorbers are positioned between the drum and the bearings mounting the drum to isolate the frame and the bearings mounting the drum from the drum. A sealed reservoir filled with a lubricant is provided in the drum for continuously lubricating the bearings.

BACKGROUND OF THE INVENTION

This invention relates to compaction rollers and in particular to vibratory compaction rollers used for compacting large areas of material.

It has been found that vibratory compactors do a much more effective job of compacting material than static compactors such as a heavy roller. A single pass of a vibratory compaction roller is often more effective than several passes with a static roller. Although vibratory compaction rollers are known, they are subject to bearing failure and central shaft breakage, particularly when rough terrain is encountered.

With many prior vibratory compaction rollers, the roller drum is supported on the same bearings as the central shaft which carries an eccentric weight and is rotated to induce vibrations in the drum. Thus, the bearings are affected by both the centrifugal force developed by the rotating eccentric weight and the load developed by the drum. The large loads placed on the bearings when such an arrangement is used often leads to premature bearing failure. In those designs where the drum is supported on bearings separate from those which support the central shaft, the beraings must absorb any deflection of the drum or frame which may occur for many reasons such as rough terrain. These deflections often cause breakage of the bearings or central shaft or both. By the present invention, a suspension system has been provided which provides for individual support of the drum and central shaft which isolates the bearings from the frame and drum deflection.

Arrangements such as that shown in U.S. Pat. No. 3,257,918 which provide for continuous lubrication of the bearings which support the central shaft are known but such arrangements are complex and do not provide for continuous lubrication of the bearings which support the drum. Such prior arrangements do not prevent dirt and water and other elements from entering the bearings and eventually causing bearing failure.

With most prior roller type vibratory compactors the amount of centrifugal force which can be generated is limited because the amount of centrifugal force which can be absorbed by the bearings is limited. In one embodiment of the present invention, the centrifugal force is transferred directly to the drum.

SUMMARY

It is therefore the principal object of this invention to provide a novel suspension system for a vibratory compaction roller.

It is another object of this invention to provide a suspension system for vibratory compaction roller which substantially isolates the support bearings from the drum.

It is a further object of this invention to provide a compaction roller which includes a novel arrangement for continuously lubricating the bearings and for preventing dirt and other foreign matter from reaching the bearings.

It is a still further object of this invention to provide a vibratory compaction roller capable of achieving a greater centrifugal force per impact.

In general these and other objects will be carried out by providing a compaction roller comprising: a frame; a cylindrical drum rotatably mounted on said frame and in rolling contact with the surface to be compacted; means for rotatably mounting said drum on said frame; bearing means mounted within said drum; a central shaft mounted in said bearings for rotation relative to said drum; means mounted on said shaft for causing vibration of the drum when said shaft is rotated; means for rotating said shaft; and first shock absorber means positioned between said drum and said means for rotatably mounting said drum for isolating said drum from said frame and said means for rotatably mounting said drum.

BRIEF DESCRIPTION OF THE DRAWINGS

This invention will be described in connection with the annexed drawings wherein.

DESCRIPTION OF THE PREFERRED EMBODIMENTS

Figure 1:
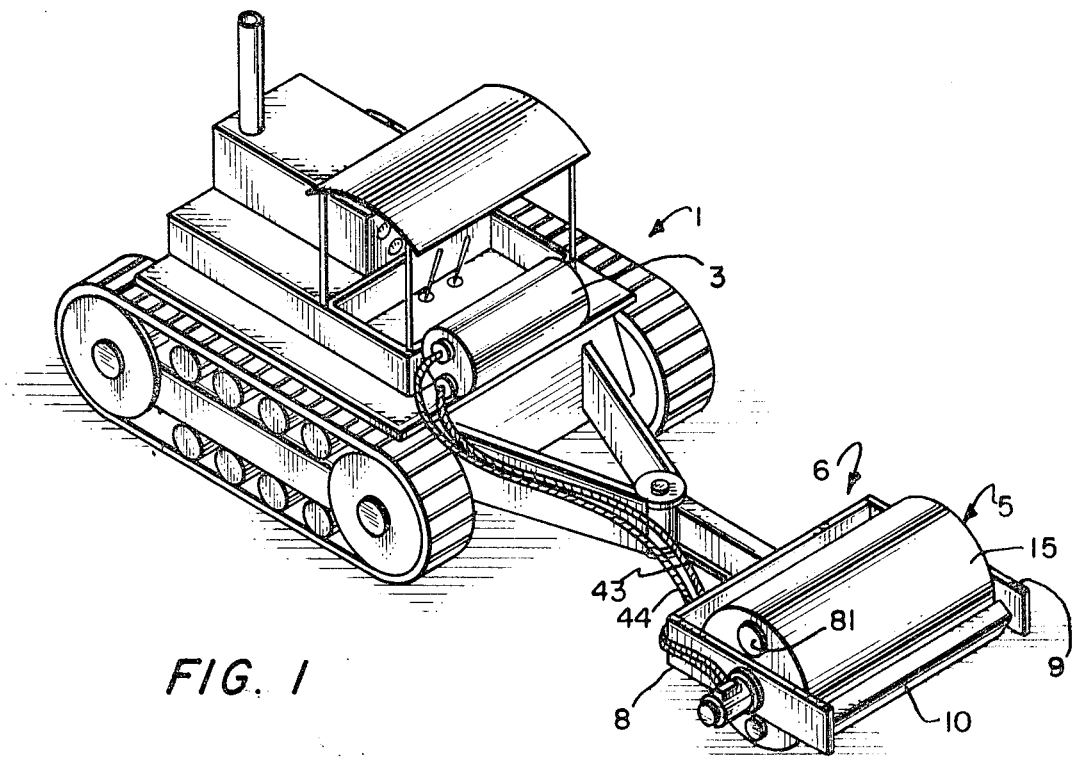
FIG. 1 is a perspective view of the compaction roller of the present invention as it is used in connection with a tractor.

In FIG. 1, I have shown a conventional tractor generally indicated at 1 which includes a hitch 2 and a source of hydraulic power 3. The compaction roller is generally indicated at 5. The compaction roller includes a frame in the form of a yoke and generally indicated at 6. The frame includes a tow bar 7 and a pair of arms 8 and 9. A connecting bar 10 is provided to insure rigidity of the yoke 6. A drum 15 is rotatably mounted in the arms of the yoke 6.

Figure 2:
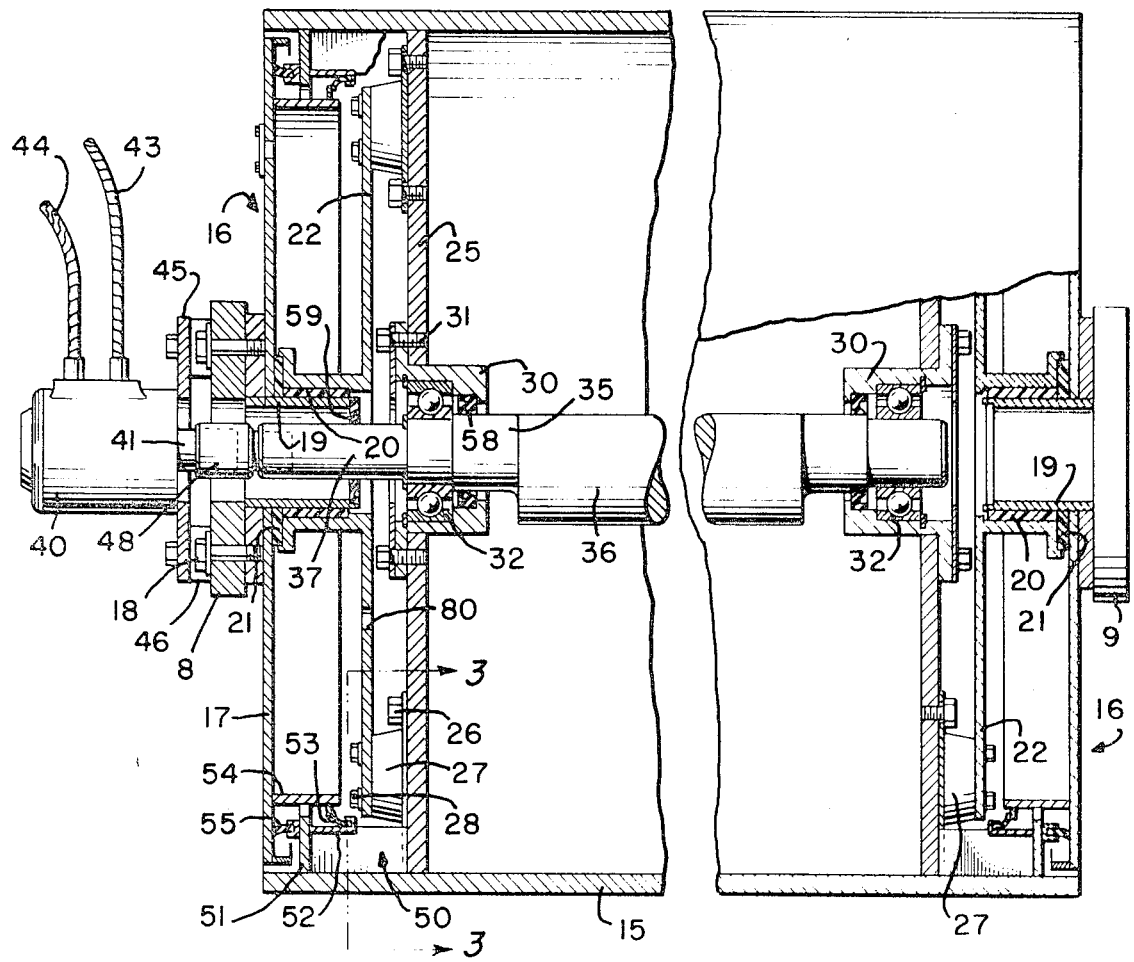
FIG. 2 is a sectional view of one embodiment of the compaction roller of the present invention.
Figure 3:
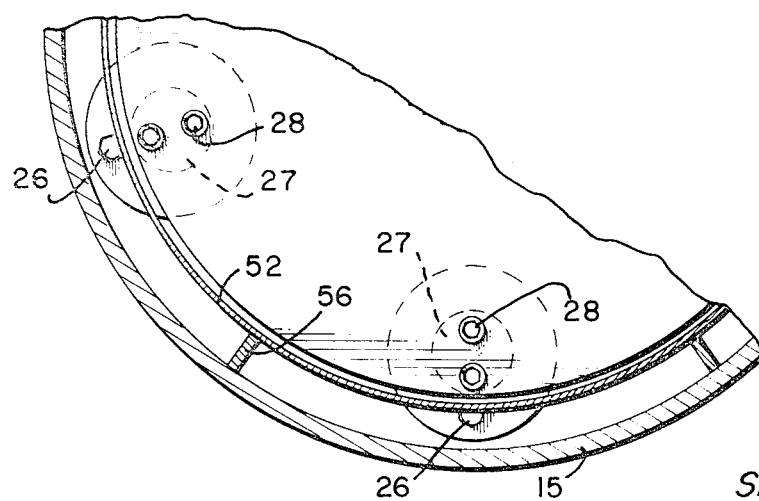
FIG. 3 is a sectional view taken on the line 3—3 of FIG. 2 looking in the direction of the arrows.

Referring now to FIG. 2, it will be seen that the drum 15 is generally open ended. I have provided means for rotatably mounting the drum 15 on the frame 6 and this means has been generally indicated at 16. A plate 17 which serves to close the end of the drum 15 is secured to each arm 8 and 9 of the frame 6 by means of bolts 18. A hollow hub member 19 is also secured to each arm 8 and 9 and extends through the end plate 17 into the drum 15. A bushing 20 surrounds the hub member 19 and a thrust bearing 21 surrounds the hub 19 and is placed against the inside of the plate 17. A plate member 22 having an outwardly turned flange 23 is rotatably mounted on the bushing 20.

A pair of annular plates 25 are secured as by welding to the inside of the drum 15. The plate 22 is secured to the plate 25 by a plurality of circumferentially spaced shock absorbers 27 which are secured to plates 25 by means of bolts 26 and to the plates 22 by means of bolts 28. The shock absorbers 27 serve to isolate the drum 15 from the frame 6 and means 16 rotatably mounting the drum on the frame. With this shock absorbing arrangement, if a deflection of the drum 15 occurs, for example when the drum moves over rough terrain, the deflection is not transferred to the bushing 20 and thrust bearing 21 and the frame 8. The virtual isolation of the bearings 20 and 21 from drum and frame deflection substantially increases bearing life because they are only subjected to the rotation of the drum.

Bearing mounts 30 are secured to the plates 25 by means of bolts 31. Bearings 32 are suitably secured to the mounts 30 and a central shaft 35 is rotatably mounted in the bearings 32. The central shaft 35 includes an eccentric weight 36 so that as the central shaft is rotated the drum 15 will be vibrated as is well known in the art.

The shaft 35 is provided with an extension 37 which extends into the hollow support member 19. A rotary motor 40, preferably a hydraulic motor, is mounted on the frame arm 8 and includes a drive shaft 41. A coupling member 42 connects the drive shaft 41 with the central shaft extension 37. Motive fluid is supplied to the hydraulic motor 40 through suitable lines 43 and 44. A hydraulic motor is preferred because most vehicles which are used for towing compaction rollers are equipped with a source of hydraulic fluid power.

The motor 40 is suitably isolated from the frame 6 by a second shock absorbing mounting. The motor 40 is secured to a plate 45 and the plate 45 is secured to the arm 8 of the frame 6 by shock absorbers 46. The shock absorbing mounts 46 serve to impede the transfer of frame deflections to the motor 40 and the transfer of any vibrations induced in the motor 40 by the rotary shaft 35 to the frame.

It will be seen that with the suspension system of the present invention the bearings 32 are subjected only to the centrifugal force from the rotating eccentric weight and the bushing 20 are only subjected to the rotation of the drum 15. This substantially increases bearing life. Because the central shaft is mounted separate from the drum and because the shaft is isolated from the frame and drum, drum and frame deflections will not cause breakage of the central shaft.

In order to further increase bearing life, an arrangement which provides for continuous lubrication of the bearings has been provided. A reservoir generally indicated at 50 is positioned on the inside of the drum 15. A pair of annular plates 51 are mounted on the inside of the drum 15 between the plates 25 and the ends of the drum. A cylindrical member 52 is mounted on the plate 51. A lip seal 53 is positioned between the cylindrical member 52 and a cylindrical member 54 secured to the end plate 17 for preventing lubricant from leaking out of the reservoir defined by the plates 25 and 51. A lip seal 55 is positioned between the plate 17 and the annular member 51 for preventing dirt and other elements from entering the inside of the drum 15 and the reservoir 50. A suitable lubricant such as oil partially fills the reservoir 50. A plurality of circumferentially spaced paddles 56 secured to the inside of the drum 15 serve to splash the oil around the inside of the drum and lubricate the bearings 32 and the bushing 20 and thrust bearing 21. A seal 58 is provided to prevent the lubricant from passing beyond the bearings 32 and a seal 59 serves to prevent lubricant from passing out of the drum through the hub 19 and dirt from entering the drum through the hub plate 25 and the end of the drum, continuous lubrication of both the bearings 32 and the bearings which support the drum is insured.

Figure 4:
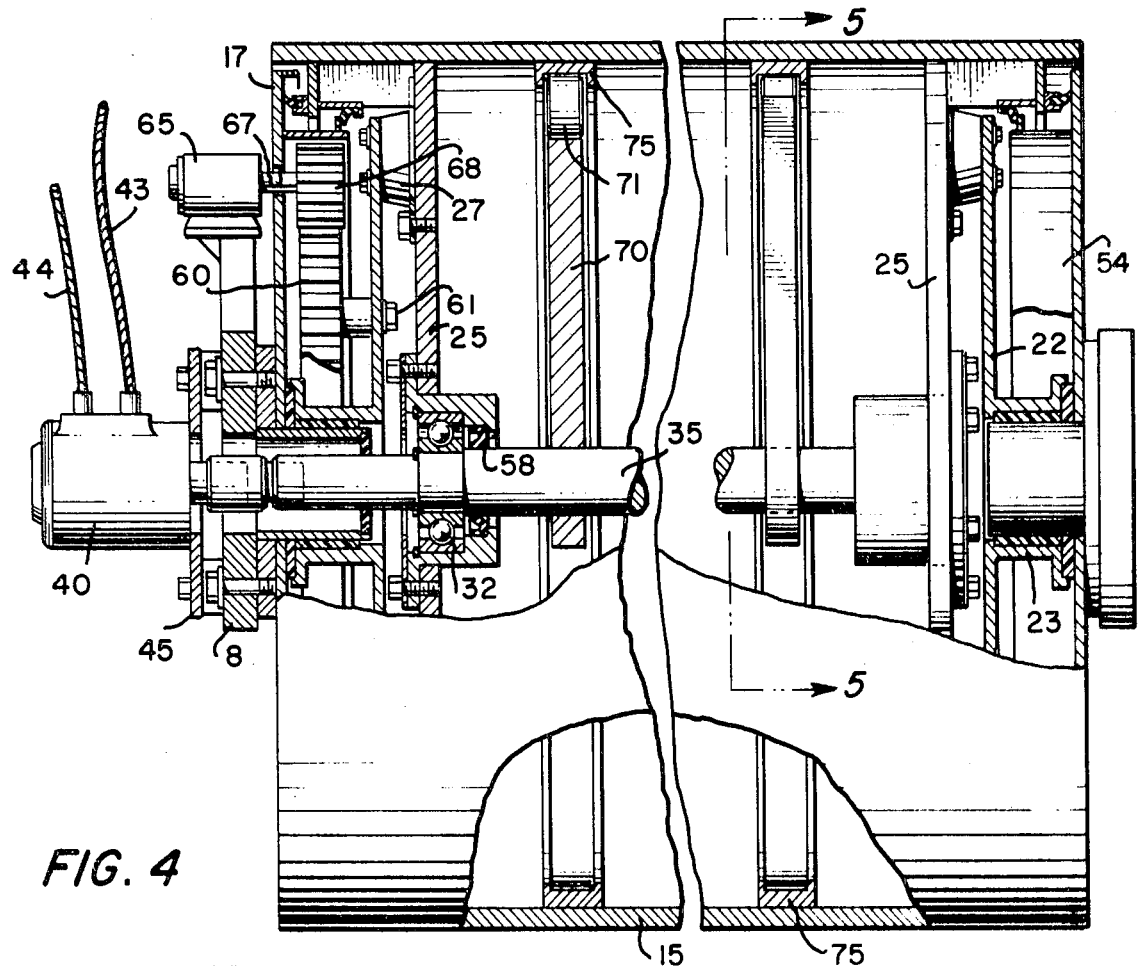
FIG. 4 is a view similar to FIG. 2 showing a second embodiment of the present invention.
Figure 5:
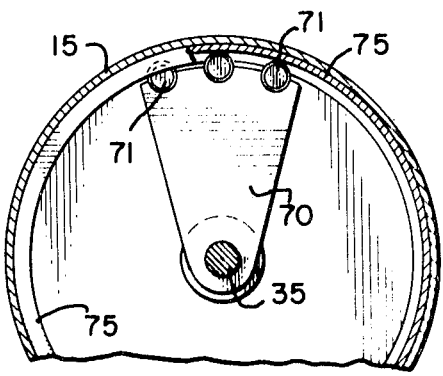
FIG. 5 is a view taken on the line 5—5 of FIG. 4.

Referring now to the embodiments of FIGS. 4 and 5, the suspension and lubrication systems are identical to that used in the embodiment of FIG. 2 and like parts have been designated by like numerals. The embodiment of FIG. 4 has been shown as a self-propelled unit and provided with means for driving the drum which is independent of the motor 40. A spur gear 60 is secured to the plate 22 by means of suitable bolts 61. A drive motor 65 which is preferably a hydraulic motor is suitably secured to the frame 6. The drive shaft 66 of the motor 65 extends through an opening 67 in the end plate 17 and has a spur gear 68 mounted thereon. The spur gear meshes with the gear 60 to drive the drum through plate 22, shock absorbers 27 and plate 25. Although the motor 65 has been shown mounted on the frame, it may be mounted in any convenient location.

The principal difference between the embodiment of FIG. 2 and FIG. 4 is that in FIG 4 instead of providing a simple eccentric weight for causing the drum to vibrate, a pair of carriers 70 suitably mounted on the central shaft 35 have been provided. Each carrier 70 includes three roller elements 71 suitably mounted thereon. A pair of races 75 are secured directly to the inside of the drum 15. Each of the roller elements 71 contacts the race 75 so that as the central shaft 35 rotates, the rollers 71 move around the races 75 and the carriers 70 are supported by the drum 15. In this embodiment, the carrier may be much heavier hence developing a greater centrifugal force than is capable when a simple eccentric weight such as that shown in the embodiment of FIG. 2. This is because the centrifugal force developed by the rotating eccentric weights 70 is transferred directly to the drum and need not be carried exclusively by the bearings which support the central shaft. In the embodiment of FIG. 2, the vibration generating apparatus is supported solely by the bearings 32. In a large compaction roller capable of developing high centrifugal force such as that shown in FIG. 4, bearings cannot be provided which are able to withstand the loads developed by the eccentric weights 70.

Although the embodiment of FIG. 2 has been shown as a towed roller, it can easily be converted to a self-propelled vehicle. In order to accomplish this, a spur gear such as the gear 60 of FIG. 4 is secured to the plate 22 as by bolts through the holes 80 in the plate 22. The cover plate 81 is removed from the end plate 17 and the drive shaft of a motor such as motor 65 in FIG. 4 is inserted through the opening 67 in the plate 17. A spur gear secured to the motor drive shaft meshes with the drive gear to directly drive the drum.

MODIFICATIONS

Figure 6:
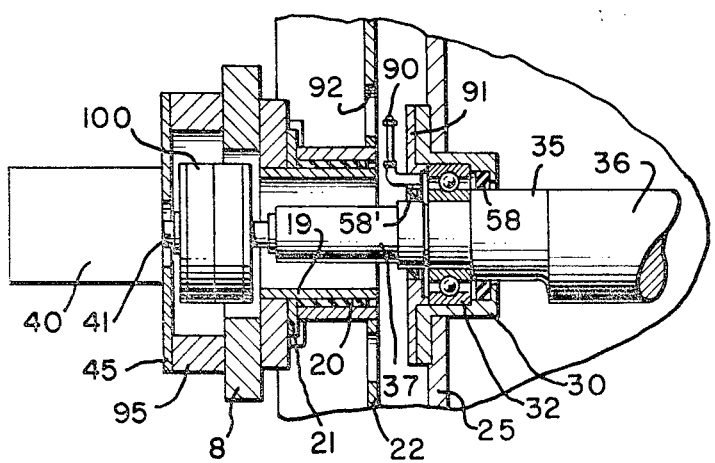
FIG. 6 is a fragmentary sectional view of one modification of the present invention.
Figure 7:
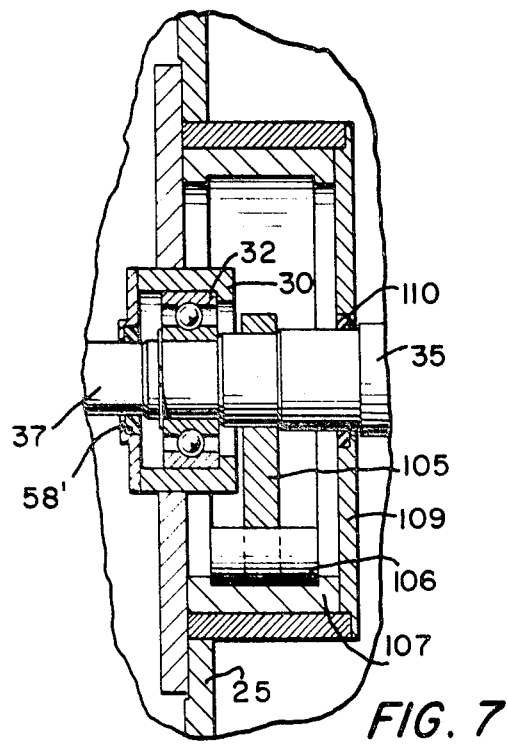
FIG. 7 is a fragmentary sectional view of a second modification of the present invention.

In FIGS. 6 and 7, I have shown modifications of the present invention. In FIG. 6, the reservoir 50 and the accompanying lip sealing arrangement has been replaced by a greased bearing arrangement. In FIG. 6, the bearing mounts 30 and bearing 32 are the same as in FIGS. 2 and 4. A seal 58 prevents lubricant from passing beyond the bearing 32. A well known grease fitting 90 is mounted in a plate 91 on the outside of the bearing mount 30. An opening 92 is provided in the plate 22 to permit access to the grease fitting 90. In order to provide adequate lubrication of the bearing 32, the bearing is periodically greased through the fitting 90.

In the embodiment of FIG. 6, the motor 40 is mounted directly on the frame through mounts 95. The motor shaft 41 is connected to the shaft extension 37 by means of a rubber or other elastomeric material coupling 100. The coupling 100 serves to substantially eliminate the transfer of non-rotary movement from the shaft 35 to the motor shaft 41.

The modification of FIG. 7 is similar in principle to the embodiment of FIG. 4. In FIG. 7, a pair of carriers 105 having rollers 106 are mounted on each end of the shaft 35. These carriers are similar to the carriers 70 of FIGS. 4 and 5 except smaller. A race 107 is mounted on the plate 25 insde the drum 15. Each of the rollers 106 contacts the race 107 so that as the central shaft 35 rotates, the rollers 106 move around the race 107. The centrifugal force developed by the rotating carriers 105 is transferred to the drum 15 through the plate 25 and need not be carried exclusively by the bearing which support the shaft 35 in a manner similar to the embodiment of FIG. 4.

The bearing 32 in FIG. 7 may be held in the plate 25 by means of a mount 32 and includes a suitable seal 58'. The bearing 32 may be lubricated as in FIG. 6 or a lubricant may be carried in the area defined by the race 107. An annular plate 109 may be used to provide a closed area around the race 107 and a seal 110 may be used to prevent lubricant from leaking out of this area and dirt and grease from entering this area. In this manner continuous lubrication of the bearings and race can be achieved.

It should be apparent from the foregoing that the objects of this invention have been carried out. A compaction roller having a novel suspension system and bearing arrangement has been provided as well as an arrangement which insures continuous lubrication of the bearings thus insuring longer life regardless of the conditions encountered.

I claim:

1. A compaction roller comprising:
   a frame;
   a cylindrical drum rotatably mounted on said frame and in rolling contact with the surface to be compacted;
   means for rotatably mounting said drum on said frame;
   bearing means mounted within said drum;
   a central shaft mounted in said bearings for rotation relative to said drum;
   means mounted on said shaft for causing vibration of the drum when said shaft is rotated;
   means for rotating said central shaft; and
   first shock absorbing means positioned between said drum and said means for rotatably mounting said drum for isolating the vibrations of said drum from said frame and said means for rotatably mounting said drum;
   said frame is a yoke and said drum is rotatably mounted between the arms of said yoke; and wherein;
   said means for rotatably mounting said drum on said frame includes a hub secured to each arm of said yoke and a pair of annular plate means, each rotatably mounted on one of said hubs;
   said drum being secured to said annular plate means through said first shock absorber means.

2. The compaction roller of claim 1 wherein at least one of said hubs is hollow and one end of said central shaft extends into the hollow hub and is drivingly connected with said means for rotating said central shaft and seal means is positioned between said central shaft and hollow support member.

3. The compaction roller of claim 2 further comprising an elastomeric coupling for connecting said means for rotating said central shaft to said central shaft.

4. The compaction roller of claim 2 further comprising means positioned within said said drum defining a reservoir adapted to contain a lubricant for lubricating said bearing means; and seal means for preventing foreign matter from entering said drum.

5. The compaction roller of claim 4 further comprising race means mounted within said drum and said means mounted on said central shaft is a carriage having roller means mounted thereon for movement around said race means.

6. The compaction roller of claim 5 further comprising motor means independent of said means for rotating the central shaft for rotating said drum.

7. A compaction roller comprising;
   a frame;
   a cylindrical drum rotatably mounted on said frame and in rolling contact with the surface to be compacted;
   means for rotatably mounting said drum on said frame;
   bearing means mounted within said drum;
   a central shaft mounted in said bearings for rotation relative to said drum;
   means mounted on said shaft for causing vibration of the drum when said shaft is rotated;
   means for rotating said central shaft; and
   first shock absorbing means positioned between said drum and said means for rotatably mounting said drum for isolating the vibrations of said drum from said frame and said means for rotatably mounting said drum; and further comprising
   a shock absorbing coupling for connecting said means for rotating said shaft to said central shaft; and wherein
   said coupling is an elastomeric coupling.

8. A compaction roller comprising:
   a frame;
   a cylindrical, open ended drum in rolling contact with the surface to be compacted;
   means for rotatably mounting said drum on said frame;
   plate means mounted on said frame for closing the ends of said drum;
   seal means positioned between said drum and said plate means;
   bearing means mounted within said drum;
   a central shaft mounted in said bearings for rotation relative to said drum;
   means mounted on said shaft for causing vibration of the drum when said shaft is rotated; and
   means defining a reservoir within said drum for containing a lubricant for lubricating said bearings.

9. The compaction roller of claim 8 further comprising first shock absorber means positioned between said drum and said means for rotatably mounting said drum on said frame.

10. The compaction roller of claim 9 further comprising means for rotating said central shaft and means for rotating said drum.

11. The compaction roller of claim 8 further comprising a pair of spaced apart annular plates mounted on the inside of said drum and said bearing means includes a pair of bearings, each mounted in one of said annular plates and there are a pair of reservoirs, each positioned between one of said annular plates and one end of said drum.

12. The compaction roller of claim 11 wherein said means defining a reservoir includes said annular plate and paddle means is mounted on the inside of said drum within said reservoir.

13. The compaction roller of claim 12 wherein said means mounted on said central shaft is a carriage having roller means mounted thereon and race means is mounted within said drum and said roller means is adapted to move around said race.

References Cited

UNITED STATES PATENTS

| | | | |
|---|---|---|---|
| 2,671,386 | 3/1954 | Kerridge | 94—50 |
| 2,873,656 | 2/1959 | Andersson | 94—50 |
| 3,052,166 | 9/1962 | Thrun | 94—50 X |
| 3,105,424 | 10/1963 | Dion | 94—50 |
| 3,225,669 | 12/1965 | Green | 94—50 |
| 3,257,918 | 6/1966 | Garis | 94—50 |
| 3,323,428 | 6/1967 | Domenighetti | 94—50 |
| 3,411,420 | 11/1968 | Martin | 94—50 |
| 3,437,019 | 4/1969 | Peterson | 94—50 |
| 3,439,594 | 4/1969 | Cowly | 94—50 |
| 3,486,427 | 12/1969 | Waschulewski | 94—50 |

NILE C. BYERS, Primary Eaminer

U.S. Cl. X.R.

94—50 V